United States Patent [19]

Bartrug et al.

[11] Patent Number: 6,025,025
[45] Date of Patent: *Feb. 15, 2000

[54] WATER-REPELLENT SURFACE TREATMENT

[75] Inventors: Bruce A. Bartrug, Lower Burrell; George B. Goodwin, Cranberry Township; Chia-Cheng Lin, Allison Park, all of Pa.

[73] Assignee: PPG Industries Ohio, Inc., Cleveland, Ohio

[ * ] Notice: This patent is subject to a terminal disclaimer.

[21] Appl. No.: 09/095,200

[22] Filed: Jun. 10, 1998

Related U.S. Application Data

[60] Continuation-in-part of application No. 08/985,554, Dec. 5, 1997, which is a division of application No. 08/660,352, Jun. 7, 1996, Pat. No. 5,707,740, which is a continuation-in-part of application No. 08/461,464, Jun. 5, 1995, abandoned, which is a continuation-in-part of application No. 08/363,803, Dec. 27, 1994, Pat. No. 5,523,161, which is a continuation-in-part of application No. 08/220,353, Mar. 30, 1994, abandoned, which is a continuation-in-part of application No. 07/589,235, Sep. 28, 1990, Pat. No. 5,308,705, which is a continuation-in-part of application No. 07/503,587, Apr. 3, 1990, Pat. No. 4,983,459.

[51] Int. Cl.$^7$ ........................................................ B05D 3/02
[52] U.S. Cl. .......................... 427/302; 427/308; 427/309; 427/327; 427/167
[58] Field of Search .................................. 427/308, 309, 427/327, 393.4, 167, 302

[56] References Cited

U.S. PATENT DOCUMENTS

| | | |
|---|---|---|
| 2,526,431 | 10/1950 | Strickhouser . |
| 3,481,756 | 12/1969 | Kong . |
| 3,758,284 | 9/1973 | Haller . |
| 3,950,588 | 4/1976 | McDougal . |
| 4,263,371 | 4/1981 | Franz . |
| 4,276,350 | 6/1981 | Franz . |
| 4,301,197 | 11/1981 | Franz et al. . |
| 4,381,204 | 4/1983 | Erickson . |
| 4,529,657 | 7/1985 | Franz . |
| 4,617,057 | 10/1986 | Plueddemann . |
| 4,724,022 | 2/1988 | Armstrong . |
| 4,879,345 | 11/1989 | Connelly et al. . |
| 4,983,459 | 1/1991 | Franz et al. . |
| 4,997,684 | 3/1991 | Franz et al. . |
| 5,221,371 | 6/1993 | Miller . |
| 5,250,322 | 10/1993 | Takahashi et al. . |
| 5,266,358 | 11/1993 | Uemura et al. . |
| 5,308,705 | 5/1994 | Franz et al. . |
| 5,314,731 | 5/1994 | Yoneda et al. . |
| 5,328,768 | 7/1994 | Goodwin . |
| 5,368,892 | 11/1994 | Berquier . |
| 5,413,865 | 5/1995 | Nakamura et al. . |
| 5,421,866 | 6/1995 | Stark-Kasley et al. . |
| 5,424,130 | 6/1995 | Nakanishi et al. . |
| 5,425,804 | 6/1995 | Shinohara et al. . |
| 5,523,161 | 6/1996 | Goodwin . |
| 5,523,162 | 6/1996 | Franz et al. . |
| 5,674,967 | 10/1997 | Goodwin . |
| 5,688,864 | 11/1997 | Goodwin . |
| 5,693,365 | 12/1997 | Teranishi et al. . |
| 5,707,740 | 1/1998 | Goodwin . |

FOREIGN PATENT DOCUMENTS

| | | |
|---|---|---|
| 0 166 363 | 1/1986 | European Pat. Off. . |
| 0 339 583 | 11/1989 | European Pat. Off. . |
| 0 476 510 | 3/1992 | European Pat. Off. . |
| 0 513 690 | 11/1992 | European Pat. Off. . |
| 0 513 727 | 11/1992 | European Pat. Off. . |
| 0 545 201 | 6/1993 | European Pat. Off. . |
| 0 548 775 | 6/1993 | European Pat. Off. . |
| 0 678 521 | 10/1995 | European Pat. Off. . |
| 0 696 627 | 2/1996 | European Pat. Off. . |
| 0 719 743 | 7/1996 | European Pat. Off. . |
| 0 492 545 | 7/1997 | European Pat. Off. . |

(List continued on next page.)

OTHER PUBLICATIONS

Miall & Sharp, "A New Dictionary of Chemistry", 4th edition, p. 440.
John Wiley & Sons, NY; "Encyclopedia of Polymer Science and Engineering", vol. 16, pp 533–534 (1989) no month.
European Search Report and Communication for European Application No. EP 96107844, dated Aug. 22 1996.
European Search Report and Communication for European Application No. EP 96107845, dated Aug. 22, 1996.
European Search Report and Communication for European Application No. EP 91608846, dated Oct. 8, 1997.
Monde, Takashi et al.; "Adsorption Characteristics of Silica Gels Treated with Fluorinated Silylation Agents", *Journal of Colloid and Interface Science*, 185, pp 111–118 no month (1997).

*Primary Examiner*—Brian K. Talbot
*Attorney, Agent, or Firm*—Kenneth J. Satchel; Andrew C. Siminerio

[57] ABSTRACT

The present invention relates to a method of improving the durability of water-repellent films deposited on the surface of a substrate and to a coated article having a water-repellent film of improved durability deposited on the substrate surface. The method includes the steps of simultaneously abrasively and chemically preparing the surface to expose an increased number of bonding sites on the substrate surface by applying a dispersion including an acid solution and an abrasive material to the surface. The dispersion is then removed and the water-repellent film is formed over the prepared surface. The bonding sites react with the water-repellent film to more effectively bond the film to the substrate and thereby improve the durability of the water-repellent film. The abrading material is preferably selected from the group consisting of alumina, ceria, iron oxide, garnet, zirconia, silica, silicon carbide, chromic oxide, pumice and diamond, and the acid solution is preferably selected from the group consisting of solutions of hydrochloric acid, sulfuric acid, tartaric acid, phosphoric acid, hydrobromic acid, nitric acid, acetic acid, trifluoroacetic acid, oxalic acid and citric acid.

29 Claims, No Drawings

FOREIGN PATENT DOCUMENTS

| | | |
|---|---|---|
| 1139874 | 7/1957 | France . |
| 1166259 | 11/1958 | France . |
| 1498087 | 10/1967 | France . |
| 2074295 | 10/1971 | France . |
| 1596873 | 8/1970 | Germany . |
| 3701654 | 7/1987 | Germany . |
| 4218657 | 12/1992 | Germany . |
| 58-172244 | 10/1983 | Japan . |
| 58-172245 | 10/1983 | Japan . |
| 58-211701 | 12/1983 | Japan . |
| 59-222272 | 12/1984 | Japan . |
| 61-278574 | 12/1986 | Japan . |
| 1-95181 | 4/1989 | Japan . |
| 89-154533 | 4/1989 | Japan . |
| 62-252120 | 7/1989 | Japan . |
| 1-275674 | 11/1989 | Japan . |
| 02/311332 | 12/1990 | Japan . |
| 05024886 | 2/1993 | Japan . |
| 93-59331 | 3/1993 | Japan . |
| 353911 | 7/1931 | United Kingdom . |
| 965790 | 8/1964 | United Kingdom . |
| 2230260 | 10/1990 | United Kingdom . |
| 95/04608 | 2/1995 | WIPO . |

WATER-REPELLENT SURFACE TREATMENT

CROSS REFERENCE TO RELATED APPLICATION

This application is a continuation-in-part of U.S. application Ser. No. 08/985,554 filed Dec. 5, 1997, which is a divisional application of U.S. application Ser. No. 08/660,352 filed Jun. 7, 1996, now U.S. Pat. No. 5,707,740, which is a continuation-in-part application of U.S. application Ser. No. 08/461,464 filed Jun. 5, 1995, now abandoned, which is a continuation-in-part of U.S. application Ser. No. 08/363,803 filed Dec. 27, 1994, now U.S. Pat. No. 5,523,161, which is a continuation-in-part of U.S. application Ser. No. 08/220,353 filed Mar. 30, 1994, now abandoned, which is a continuation-in-part of U.S. application Ser. No. 07/589,235 filed Sep. 28, 1990, now U.S. Pat. No. 5,308,705, which is a continuation-in-part of U.S. application Ser. No. 07/503,587 filed Apr. 3, 1990, now U.S. Pat. No. 4,983,459.

BACKGROUND OF THE INVENTION

1. Field of the Invention

The present invention relates generally to the art of producing a water-repellent film on various substrates, and more particularly, to improving the durability of such water-repellent films. The durability is improved by modifying the surface of the substrate to expose a plurality of bonding sites on the surface of the substrate, which bonding sites react with the water-repellent film to more effectively bond the film to the substrate, thereby improving the durability of the water-repellent film.

In addition to or in lieu of the foregoing, the durability of the water-repellent film may also be improved by controlling certain process and environmental conditions under which the water-repellent film is deposited over the surface of the substrate.

2. Relevant Art

U.S. Pat. No. 4,997,684 to Franz et al. discloses a method for providing a durable nonwetting surface on glass by contacting the glass with a perfluoroalkylalkyl silane and a fluorinated olefin telomer and heating the glass to produce a durable non-wetting surface.

U.S. Pat. No. 5,328,768 to Goodwin discloses a technique for producing a durable non-wetting surface on a glass substrate, wherein the surface of the substrate is cleaned with a water and 50/50 by volume isopropanol/water solution. The surface is then treated with a silica primer layer and a perfluoroalkylalkyl silane over the primer layer. The silica primer layer improves the durability of the water repellency of the surface.

U.S. Pat. No. 5,523,162 to Franz et al. discloses a method for producing a durable non-wetting surface on a plastic substrate, herein the surface of the plastic substrate is cleaned with hexane and then methanol. The surface is then treated with a silica primer layer and a perfluoroalkylalkyl silane.

U.S. Pat. No. 5,674,967 to Goodwin discloses compositions for producing water-repellent surfaces on a substrate which include perfluoroalkylalkyl silane and compounds selected from silanes and siloxanes capable of hydrolysis to a silica gel.

U.S. Pat. No. 5,688,684 to Goodwin discloses a composition for producing a non-wetting surface on a substrate comprising a perfluoroalkylalkyl silane in aprotic solvents which limit the evaporation of the solvent during application of the composition to the surface of the substrate.

U.S. Pat. No. 5,693,365 to Teranishi et al. discloses a method for forming a water-repellent film on the surface of a transparent substrate (e.g., sheet glass). While the film on the coated substrate is dried, the temperature is controlled to fall between 15° C. and 25° C., the relative humidity is controlled to be 30% or preferably from 15% to 20%, and the speed of the air stream to be applied to the coated substrate is controlled to be 0.5 m/min. or lower.

While the foregoing U.S. patents disclose durable water-repellent films, it can be appreciated by those skilled in the art that making available additional technology to improve the durability of the water-repellent surface is advantageous and desirable.

SUMMARY OF THE INVENTION

The present invention relates to a method of improving the durability of water-repellent films deposited on the surface of a substrate and to a coated article having a water-repellent film of improved durability is deposited on the substrate surface. The method includes the steps of simultaneously abrasively and chemically preparing the surface to expose an increased number of bonding sites on the substrate surface by applying a dispersion including an acid solution and an abrasive material to the surface. The dispersion is then removed and the water-repellent film is formed over the prepared surface. The bonding sites react with the water-repellent film to more effectively bond the film to the substrate and thereby improve the durability of the water-repellent film. The abrading material is preferably selected from the group consisting of alumina, ceria, iron oxide, garnet, zirconia, silica, silicon carbide, chromic oxide, pumice and diamond, and the acid solution is preferably selected from the group consisting of solutions of hydrochloric acid, sulfuric acid, tartaric acid, phosphoric acid, hydrobromic acid, nitric acid, acetic acid, trifluoroacetic acid, oxalic acid and citric acid.

DESCRIPTION OF THE INVENTION

The present invention relates to a method of improving the durability of a water-repellent film and to a coated article having the improved water-repellent film.

Unless otherwise stated or otherwise made clear from the context of the discussion, it is to be understood that while the foregoing and following discussions describe the water-repellent composition as being applied to the substrate itself, it is primarily the surface of the substrate which is affected by the present invention. Thus, in the following discussion, reference may be made to a substrate and substrate surface. Unless indicated otherwise, the reference to the substrate refers to the substrate surface which may be uncoated or coated with one or more films in addition to the water-repellent film of the present invention. Also, unless otherwise stated or otherwise made clear from the context of the discussion, the term "water-repellent composition" as used herein includes but is not limited to: water-repellent compositions applied over the substrate directly such as described in U.S. Pat. No. 4,983,459; water-repellent compositions having an integral primer such as described in U.S. Pat. No. 5,523,161; water-repellent compositions having a fluorinated olefin telomer such as described in U.S. Pat. No. 5,308,705; or water-repellent compositions which may be applied over a discrete primer layer applied to the substrate such as described in U.S. Pat. No. 5,328,768. The disclosures of these identified patents are incorporated herein by reference.

In the practice of the present invention, the durability of the water-repellent film is improved by modifying the surface of the substrate to provide an increased number of bonding sites on the surface of the substrate. These sites react with the water-repellent film to more effectively bond it to the substrate, thereby improving the durability of the water-repellent film. Exposing the bonding sites is sometimes referred to as activation. In a preferred embodiment of the invention, the bonding sites are exposed by treating the surface of the substrate, prior to applying the water-repellent composition over the surface of the substrate, with a dispersion including at least one abrading compound and at least one acid in solution. The abrading compound/acid solution dispersion loosens and dislodges materials, such as surface contaminants and other glass constituents, which block the bonding sites, without materially affecting the mechanical or optical properties of the surface of the substrate. A synergistic effect has been observed where the abrading compound is dispersed in the acid solution. More particularly, a water-repellent film applied to a substrate surface prepared with the abrading compound/acid solution dispersion generally exhibits improved durability as compared to preparing the substrate surface with an abrading operation alone or an acid washing operation alone, and at least as good or better than an abrading operation followed a separate acid washing operation. It is believed that the high durability is obtained from the abrading compound/acid solution dispersion because the acid solution primarily chemically weakens chemical bonds between the materials blocking the bonding sites and the substrate, rendering such materials more easily removed from the surface of the substrate, while the abrading compound(s) operate with the acid solution to physically loosen and dislodge the materials which block the bonding sites. Additionally, either the acid solution, the abrading compound or both may operate to roughen the surface of the substrate, thereby providing more surface area, and in turn more bonding sites, for reaction with the water-repellent film to improve the durability of the water-repellent film. Further, use of the abrading compound/ acid solution dispersion as disclosed in the present invention reduces the cost and time to prepare the surface of the substrate over a two-step operation of abrading followed by acid activation.

Where the substrate is a silicon-containing glass substrate, preferred bonding sites include silicon and oxygen atoms at or near the glass surface. Surface preparation, as disclosed herein, is believed to increase the number of bonding sites for adhering a water-repellent film (e.g. a perfluoroalkylalkyl silane containing water-repellent film) to the surface of the substrate. Species which may block preferred bonding sites include, but are not limited to, sodium ions, calcium ions, tin ions and iron ions.

When the tin side of a piece of clear soda-lime-silica float glass was treated with an abrading compound/acid solution dispersion in accordance with the present invention as described in Example 1 below, comparative X-ray Photoelectron Spectroscopy (XPS) analysis of the surface of the glass substrate before and after treatment with the abrading compound/acid solution dispersion revealed that there was an increase in the concentration of silicon and oxygen atoms, and a decrease in the concentration of calcium and tin atoms at or near the surface of the substrate. The acid component of the abrading compound/acid solution dispersion also helps remove abrading compound that is deposited on the glass surface during the abrading/cleaning process. Silicon and oxygen atoms are believed to form the preferred bonding sites for certain water-repellent compositions, e.g. perfluoroalkylalkyl silane-based water-repellent compositions, whereas the calcium and tin atoms along the glass surface are not believed to form preferred bonding sites. Atomic Force Microscopy (AFM) analysis revealed that the mean roughness of the glass surface, i.e. the average peak to valley distance of adjacent points along the glass surface, increased from about 0.5 nanometers before treatment to about 4 nanometers (measured over a 100 square micron area) after the treatment, providing an increase in glass surface area for subsequent reaction with water-repellent composition. The results of the comparative X-ray Photoelectron Spectroscopy and Atomic Force Microscopy analysis support the conclusion that treating the surface of the substrate with the abrading compound/acid solution dispersion of the present invention provides for both increased number of bonding sites at the substrate surface and increased surface area for bonding to improve the durability of a water-repellent composition deposited over the surface of the substrate.

It is believed that the roughened surface also improves the durability of the water-repellent coating by increasing the effective thickness of the coating layer in selected portions of the substrate. More specifically, the coating may fill in any "valleys" in the roughened surface. As a result, as the surface of the coated substrate is worn by weathering and/or abrasion, there is still water-repellent coating in the valley portions of the substrate surface.

Factors affecting the choice of acids for inclusion in the acid solution include, but are not limited to, the substrate being treated, the acid or acid combination selected, the abrading compound dispersed in the acid solution, and the strength and type of chemical bonding between the materials being removed and substrate. Although not limited in the instant invention, other factors to be considered include the acquisition cost of materials, ease of use, safety and disposal costs associated with a particular acid solution. For example, the acid solution preferably removes the materials blocking the bonding sites without completely dissolving the abrading compound dispersed therein and without damaging the surface of the substrate being treated. As may be appreciated by those skilled in the art, it is preferred that the acid be selected such that the species removed, such as, but not limited to Na, Ca, Sn, Fe and Al ions, remain soluble in the acid solution to prevent their precipitation from the acid solution and redeposition on the substrate surface.

Acids suitable for use with many substrates include those selected from the group consisting of hydrochloric acid, sulfuric acid, phosphoric acid, hydrobromic acid, nitric acid and organic acids or mixtures thereof. Where organic acids are selected, strong organic acid solutions are preferred, which includes acid solutions having a pH of less than about 5 and most preferably less than about 3 (e.g. tartaric acid, acetic acid, oxalic acid, trifluoroacetic acid, and citric acid). Acids other than those listed above which satisfy the above-described criteria may also be used in the practice of the invention.

Acid concentrations in the acid solution depend largely upon the acid or acids selected, the acid solution solvent and the interaction between the acid solution and the substrate. However, for many applications, acid concentrations are preferably generally within in the range of about 1 to 5 weight percent (hereinafter "wt %"). Where the acid is hydrochloric acid ("HCl"), an acid solution of hydrochloric acid dissolved in water (preferably deionized or otherwise good quality water), wherein the acid concentration is in the range of 0.1 to 30 wt % hydrochloric acid, may be used. An acid solution having a hydrochloric acid concentration of 0.1 to 20 wt % is acceptable while a concentrate of 0.5 to 10 wt % is preferred and 1 to 5 wt % is more preferred. The foregoing ranges and discussion are also applicable for sulfuric acid. Where the acid is tartaric acid, an acid concentration of tartaric acid in the range of 1 to 40 wt % dissolved in water may be used, with a concentration of 2 to 20 wt % preferred. As can be appreciated, lower and higher acid concentrations are acceptable; however, using such concentrations may require correspondingly more or less activating time on the substrate to improve the durability of the water-repellent film. Furthermore, additional handling procedures, as would be apparent to those skilled in the art of using such materials, may be required when using acid solutions at higher concentrations, as will be discussed later in more detail.

Factors affecting the selection of suitable abrading compounds useful in the practice of the present invention include, but are not limited to, the substrate being treated, the ability of the abrading compound to withstand the acidic environment of the acid solution, the grit size or other abrasive measure of the abrading compound, the method of treating the surface of the substrate with the abrading compound, the strength and type of bonding between the materials being removed and substrate, and the acquisition costs, ease of use, safety and disposal costs associated with a particular abrading compound. Where the surface of the substrate is treated by wiping the abrading compound/acid solution dispersion over the surface of the substrate, the amount of force directed toward the substrate and the number of passes to be applied over the surface of the substrate should be considered when selecting an abrasive compound. The abrading compound must be present in sufficient concentration and have sufficient abrasiveness to loosen and dislodge the materials blocking the bonding sites for the number of passes applied with the applied pressure, while being able to withstand the acidic environment of the acid solution and not materially affect the mechanical or optical properties of the surface, as for example, by scratching of the surface to render the substrate unacceptable for its intended use. As may be appreciated, while the preferred abrading compound is selected based upon its ability to remove materials blocking the bonding sites and not on the depth of substrate surface removed, for many applications removal of about 2 Å to about 10 Å of the substrate's surface will expose a sufficient number of bonding sites to measurably improve the durability of the water-repellent film. Abrading compounds suitable for use with many acid solutions include, but are not limited to alumina, ceria, iron oxide, garnet, zirconia, silica, silicon carbide, chromic oxide, pumice and diamond-based abrading compounds, and combinations thereof.

In general, the abrading compound preferably has a grit size in the range of about 0.1 to 20 microns, preferably 0.5 to 5 microns and more preferably 1 to 3 microns. The abrading compound may be in dry particulate form or it may be present as a dispersion in a liquid carrier. Although not limiting in the present invention, one type of abrasive that may be used is Microgrit® WCA lapping powder which is an aluminum oxide abrasive available from Micro Abrasives Corporation, Westfield, Mass. The abrading compound is preferably added in the range of about 5 to 30 wt % to an acid solution to form the abrading compound/acid solution dispersion as discussed earlier. By way of a non-limiting example, where the substrate is a glass substrate, preferred abrading compounds include alumina or ceria having an average size of about 1 to 3 microns, which are present in a total concentration of about 15 to 20 wt % in a 1 to 5 wt % hydrochloric acid/deionized water solution.

The acid activation of the substrate is accomplished by applying and wiping the abrading compound/acid solution dispersion on the substrate surface by any conventional technique known in the art. For example, the dispersion may be applied directly on the substrate surface and wiped by hand, applying moderate hand pressure to an absorbent, acid-resistant pad. The dispersion may also be applied directly to the pad and subsequently wiped on the substrate surface. Alternatively, powered equipment such as an orbital sander with a non-abrasive pad may be used to apply the abrading compound/acid solution dispersion. Preferably, the substrate surface is wiped at least until the abrading compound/acid solution dispersion "wets" the surface of the substrate, i.e. it no longer "pulls away" from any part of the substrate surface. Where the dispersion pulls away from a part of the substrate surface, it typically does so because the dispersion's cohesive forces are greater than the adhesive force of the dispersion to the substrate. The wiping operation removes surface impurities from the substrate causing the adhesive force of the abrading compound/acid solution dispersion to the substrate to exceed the cohesive force of the dispersion such that the dispersion no longer pulls away from any part of the substrate.

It has been found that the durability of a water-repellent film applied to a surface prepared using the abrading compound/acid solution dispersion of the present invention is improved by controlling selected process parameters. One selected parameter is dwell time, which is the amount of time the abrading compound/acid solution dispersion remains on the substrate before being removed from its surface. The dwell time allows the acid component of the abrading compound/acid solution dispersion to sufficiently react with materials blocking the bonding sites so that the materials are easily removed from the substrate surface. Generally, it is preferred that a dwell time in the range of about 1 to 5 minutes, and preferably about 1 to 2 minutes, be provided for the abrading compound/acid solution dispersion on the substrate surface before applying a water-repellent film on a prepared glass surface.

As will be demonstrated later, it has also been observed that when a first acid concentration is compared with a second higher acid concentration for a given dwell time, the higher acid concentration results in a water-repellent film of increased durability, all other factors remaining equal. Furthermore, where the concentration of the acid in the acid solution is increased, the dwell time may be decreased and a water-repellent film having an improved durability may be obtained.

Another selected process parameter to provide a water-repellent film having improved durability includes providing a holding period for a coated glass surface after the film has been applied. During this period the film is protected against physical contact and, in particular, against any abrading forces that might degrade the water-repellent film and direct contact of the surface by water during rainfall. The preferred holding period is at least about 24 hours, more preferably up to about 96 hours.

It is believed that the durability of the water-repellent coating may be improved by cleaning, pretreating and depositing the water-repellent film on the substrate surface under controlled relative humidity and temperature conditions. Preferred relative humidity conditions are in the range of about 30 to 80% relative humidity, more preferably about 35 to 55% relative humidity. Preferred temperature conditions are in the range of about 50° F. to 85° F. (about 10° C. to 29° C.), more preferably in the range of about 60° F. to 80° F. (about 16° C. to 27° C.).

Although it is preferred that both the substrate surface cleaning and application of the water-repellent film be performed under controlled humidity and temperature conditions, it should be appreciated that the cleaning may be done under ambient conditions while the film application is performed under controlled conditions.

None of the above-described embodiments of the present invention are limited to any particular substrate surface, and may include annealed or tempered glass, e.g. conventional soda-lime-silica glass, or ion exchange glass such as that sold under the tradename Herculite® II ion exchange glass, available from PPG Industries, Inc., Pittsburgh, Pa.; metal, plastic, enamel, or ceramic substrates and combinations thereof. Metal substrates compatible with the present invention include, but are not limited to, galvanized steel, stainless steel and aluminum. The substrate may be coated or uncoated. More specifically, the various above-described embodiments of the present invention may be practiced on a single or multi-layered coating film present on the surface of a substrate. Coatings for glass include, but are not limited to, antimony-tin oxide, doped tin oxide, or transition metal oxides. Coatings for plastic substrates include, but are not limited to, polysiloxane-based hard coatings and silicon oxide coatings. Coatings for metal substrates include, but are not limited to, metal oxide coatings. When the water-repellent composition is applied to a coating on the surface of a substrate, the coating provides the bonding sites for forming the water-repellent film.

A water-repellent composition that may be used in the practice of the present invention preferably includes a perfluoroalkylalkyl silane as disclosed in U.S. Pat. Nos. 4,997, 684; 5,328,768 and 5,523,162. Perfluoroalkylalkyl silanes that are preferred in the practice of the present invention have the general formula $R_mR'_nSiX_{4-m-n}$, wherein R is a perfluoroalkylalkyl radical; m is 1, 2 or 3; n is 0, 1 or 2; and m+n is less than 4; R' is a vinyl or an alkyl radical, preferably methyl, ethyl, vinyl or propyl; and X is preferably a radical such as halogen, acyloxy, and/or alkoxy. Preferred perfluoroalkyl moieties in the perfluoroalkylalkyl radicals range from $CF_3$ to $C_{30}F_{61}$, preferably $C_6F_{13}$ to $C_{18}F_{37}$, and most preferably $C_8F_{17}$ to $C_{12}F_{25}$; the second alkyl moiety of the perfluoroalkylalkyl is preferably a substituted ethyl. R' is more preferably methyl or ethyl. Preferred radicals for X include hydrolyzable chloro, bromo, iodo, methoxy, ethoxy and acetoxy radicals. Preferred perfluoroalkylalkyl silanes in accordance with the present invention include perfluoroalkylethyltrichlorosilane, perfluoroalkylethyltrimethoxysilane, perfluoroalkylethyltriacetoxysilane, perfluoroalkylethyidichloro(methyl)silane and perfluoroalkylethyldiethoxy(methyl)silane.

In the practice of the present invention, a discrete primer layer may be interposed between the prepared surface of the substrate and the water-repellent film as disclosed in U.S. Pat. Nos. 5,328,768 and 5,523,162. Where a discrete primer layer is selected, the primer layer is first applied over the substrate prepared in accordance to the present invention, by application methods including pyrolytic deposition, magnetron sputtering or sol-gel condensation reactions. The water-repellent composition is then applied over the primer layer. The primer layer, although not limiting in the invention, may include silica.

Alternatively, the water-repellent film that may be used in the practice of the present invention may include an integral primer which is included in the water-repellent composition, as disclosed in U.S. Pat. No. 5,523,161. The integral primer, although not limiting in the invention, may be a hydrolyzable silane or siloxane capable of hydrolytic condensation to form silica gel which functions as the integral primer.

Suitable silanes capable of hydrolysis to silica gel have the general formula $SiX_4$ wherein X is a hydrolyzable radical generally selected from the group of halogens, alkoxy and acyloxy radicals. Preferred silanes are those wherein X is preferably chloro, bromo, iodo, methoxy, ethoxy and acetoxy. Preferred hydrolyzable silanes include tetrachlorosilane, tetramethoxysilane and tetraacetoxysilane.

Suitable siloxanes have the general formula $Si_yO_zX_{4y-2z}$, wherein X is selected from the group of halogen, alkoxy and acyloxy radicals, y is two or more, and z is one or more and 4y−2z is greater than zero. Preferred hydrolyzable siloxanes include hexachlorodisiloxane, octachlorotrisiloxane and higher oligomer chlorosiloxanes.

Where the integral primer layer is selected, the water-repellent composition is applied to the substrate prepared in accordance to the present invention preferably as a solution in an aprotic solvent, preferably an alkane or mixture of alkanes, or a fluorinated solvent. Such solutions may be applied to the substrate by any conventional technique known in the art, such as but not limited to dipping, flowing or wiping, without the additional step of applying a separate primer layer.

The water-repellent composition that may be used in the practice of the present invention may also optionally include a fluorinated olefin telomer, as disclosed in U.S. Pat. Nos. 4,983,459; 4,997,684; 5,328,768 and 5,523,162, to provide lubricity to promote dirt repellency of the water-repellent surface. A preferred olefin telomer is selected from the group represented by the general formula $C_mF_{2m+1}CH=CH_2$, where m is from 1 to 30, preferably 1 to 16, more preferably 4 to 10.

Durability of the water-repellent film applied in accordance with the present invention is measured in terms of the ability of the film surface to maintain a high contact angle over time under accelerated weathering conditions (environmental durability), after surface abrasion (mechanical durability), or both. The higher the degree of contact angle that can be maintained by the sample tested over time under accelerated weathering conditions and/or number of surface abrading wiping cycles, the more durable the film and the greater the surface repels water. As may be appreciated by those skilled in the art, apart from durability, the contact angle of a drop of water on a freshly activated surface prior to coating the surface with a water-repellent film may be used to indicate the degree of decontamination of the substrate surface; the lower the contact angle, the cleaner the substrate surface.

The contact angle recited herein is a measure of the angle between a tangent to the drop shape at the contact point and the surface of the substrate as measured through the drop and is measured by the sessile drop method using a modified captive bubble indicator manufactured by Lord Manufacturing, Inc., equipped with Gaertner Scientific goniometer optics. The surface to be measured is placed in a horizontal position, facing upward, in front of a light source. A sessile drop of water is placed on top of the surface in front of the light source so that the profile of the sessile drop can be viewed and the contact angle measured in degrees through the goniometer telescope which is equipped with circular protractor graduations.

Simulated weathering of the water-repellent film was obtained via weathering chambers which include the Q-C-T Cleveland Condensing Tester (hereinafter "CCC") (also known as the Cleveland Condensing Cabinet) and QUV-B313 Tester (both products of The Q-Panel Company, Cleveland, Ohio). The CCC chamber was operated at a vapor temperature of 120° F. (49° C.) in an indoor ambient environment which resulted in constant water condensation on the test surface. The QUV-B313 Tester was operated with cycles of eight hours UV (B313 lamps) at black panel temperature of 65 to 70° C. followed by four hours condensing humidity at 50° C. atmosphere temperature.

The abrasion resistance of the water-repellent film was also measured by conducting a Wet Sled Abrasion Test. More specifically, the test was conducted using a modified Sheen Wet Abrasion Scrub Tester (ref. 903), manufactured by Sheen Instruments, Ltd., Kingston, England, that cycled two 1.5 inch (3.81 cm) long wiper blades across the surface of the water-repellent film while water was applied in front of and behind the wiper blades. A total load of about 710 grams was applied to both blades as they were moved at a rate of approximately 37 full cycles per minute. Both blades abraded a common area of about 1.5 inches by 7 inches (about 3.8 cm by 17.8 cm). With this arrangement, each wiping cycle is equivalent to 4 wiper strokes across the common area.

The present invention will be further understood from the descriptions of specific examples which follow. In the following examples, glass samples were cut from a piece of glass cut from a float glass ribbon formed on a molten tin bath. All abrading, cleaning, activating and coating procedures described in the following examples were performed on the surface of the glass which was in contact with the molten tin during glass forming. This side is commonly referred to as the "tin side" or "tin surface" of the glass.

EXAMPLE 1

Two 0.16 inches thick (0.4 cm) clear float glass samples cut from the same piece of glass were cleaned with deionized water and a paper towel. Sample 1 did not receive any additional treatment. The surface of Sample 2 was further treated by hand abrading with an abrading compound/acid solution dispersion and a cellulosic pad. This dispersion included about 15 wt % Microgrit® WCA3T powder, which is an $Al_2O_3$ abrasive powder with a 3 micron average particle size in a liquid carrier, about 4.3 wt % HCl, and deionized water (balance). After 120 seconds of hand abrading, the surface was wiped clean with deionized water and paper towels and dried. Pieces of Samples 1 and 2 were cut for X-ray Photoelectron Spectroscopy (XPS) analysis of their treated side. The data revealed the following concentrations (in atom %) of selected atoms within a depth of about 50 Å from the tin surface:

TABLE 1

| | Concentrations (atom %) | |
|---|---|---|
| Atom | Sample 1 (untreated) | Sample 2 (treated) |
| [Na] | 2.4 | 2.3 |
| [Sn] | 3.1 | 1.2 |
| [Ca] | 2.6 | 1.6 |
| [Si] | 19.4 | 21.7 |
| [O] | 60.7 | 61.2 |

As may be seen from the above data, Sample 2, which included the combined abrading compound/acid solution dispersion operation, realized significant reductions in tin and calcium atoms as compared to untreated Sample 1 and an increase in silicon and oxygen atoms. It is believed that the reduction in tin and calcium atoms and the increase in silicon and oxygen atoms increases the number of bonding sites to provide a more durable hydrophobic coating on glass.

It is speculated that, in general, surface treatments of the type disclosed herein mainly effect the substrate surface within a depth of 10 Å and have a lesser effect on deeper portions of the glass. As a result, due to the nature of the data generated by the XPS test method, the actual difference in atom % within a 10 Å depth from the substrate surface is believed to be greater than that indicated by the atom % data.

EXAMPLE 2

Two pieces of clear float glass of about 12 inches by 36 inches by 0.16 inches thick (30.5 cm by 91.5 cm by 0.4 cm) were cleaned with deionized water and paper towels. The surface of Sample 3 was then abraded using a dispersion of 15 wt % Microgrit® WCA1T powder, which is an $Al_2O_3$ abrasive with a 1 micron average particle size in a liquid carrier, in deionized water (balance), cleaned with deionized water and dried with paper towels, wiped with a 5 wt % HCl/deionized water solution using a cellulosic pad for 120 seconds, cleaned with deionized water and dried with paper towels. The surface of Sample 4 was abraded with an aluminum oxide/acid dispersion of about 15 wt % Microgrit® WCA1T powder, about 4.3 wt % HCl, and deionized water (balance). The substrate surface was then wiped clean with 5 wt % HCl/deionized water solution and paper towels, wiped with a 5 wt % HCl/deionized water solution for 120 seconds, cleaned with deionized water and paper towels, and dried. For both samples, the abrading operation was performed using an orbital sander and a polyester felt pad for a period of 60 seconds. Pieces of Samples 3 and 4 were cut for X-ray Photoelectron Spectroscopy (XPS) analysis of their surfaces. The data revealed the following concentrations (in atom %) of select atoms within a depth of about 50 Å from the surface:

TABLE 2

| | Concentrations (atom %) | |
|---|---|---|
| Atom | Sample 3 (abraded) | Sample 4 (acid/abraded) |
| [Na] | 0.7 | 0.4 |
| [Sn] | 0.9 | 0.7 |
| [Ca] | 1.8 | 1.3 |
| [Si] | 22.9 | 23.4 |
| [O] | 60.3 | 60.6 |

As may be seen from the above data, Sample 4, which included the combined abrading compound/acid solution dispersion operation, realized reductions in sodium, tin and calcium atoms and increases in silicon and oxygen atoms as compared to Sample 3, which included the non-acidified $Al_2O_3$ abrading operation. These changes were evident even after both samples were treated for 120 seconds with 5 wt % HCl. As discussed earlier, it is believed that these changes assist in the formation of a durable hydrophobic coating on glass pretreated in this manner.

EXAMPLE 3

This example compared the durability of a water-repellent film formed on the surface of glass samples that were prepared by either (a) a two-step process, i.e. abrasively preparing the surface followed by an acid cleaning of the surface, or (b) a one-step process, i.e. using the abrading compound/acid solution dispersion as taught in the present invention.

The surfaces of three pieces of Solex® float glass, sold by PPG Industries, Inc., Pittsburgh, Pa. (collectively referred to as Sample 5), were hand wiped with a cotton pad soaked with a dispersion of about 13 wt % Microgrit® WCA3T powder in deionized water for about 10 back and forth strokes. The pieces were then wiped by hand for about 30 seconds with deionized water and paper towels until the surface of the glass was free of precleaner. Each glass surface was then dried using paper towels and subsequently hand wiped for 10 back and forth strokes with a 1 wt % HCl/deionized water solution using a cotton pad. The acid solution was removed from each surface by wiping the surface with deionized water and paper towels for about 30 seconds to render the surface free of acid solution. Each surface was then coated with one application of a water-repellent composition having the following composition: a mixture of 0.75 wt % 1H,1H,2H,2H-perfluoro-decyltrichlorosilane, 0.75 wt % silicon tetrachlorosilane, and the balance a hydrocarbon solvent, e.g. Isopar® L solvent, available from Exxon orporation, Houston, Tex. The water-repellent composition was applied to the surface of the glass pieces by a cotton pad and was immediately removed with a paper towel. The surfaces of three additional pieces of Solex® glass (collectively referred to as Sample 6) were hand wiped for 10 back and forth strokes with a cotton pad soaked with an abrading compound/acid solution dispersion that was about 13 wt % Microgrit® WCA3T powder, about 0.87 wt % HCl and the balance deionized water. The pieces were then wiped clean with deionized water and paper towels and dried and coated with a single application of the same water-repellent composition as described above. After applying the water-repellent coating, both sets of samples were stored together for four days under ambient indoor conditions, free from high-moisture conditions, i.e. free from direct contact with water or conditions that would result in water condensation on the coated surface and free from any abrading forces.

Samples 5 and 6 were subjected to accelerated testing in a QUV-B313 test chamber and a the Q-C-T Cleveland Condensing Tester for six weeks (1,008 hours) and the contact angle of the coated surface of the glass was measured at the end of the testing period. Samples were also subjected to the Wet Sled Abrasion Test with the contact angle measured for selected samples after 30,000 and 60,000 cycles. The testing results are shown in Table 3 below. In measuring the contact angle, three readings were taken for each piece of each sample and the average of the three reading is reported below.

TABLE 3

| Sample No. | Initial Contact Angle | Contact Angle After 6 Wks. QUV | Contact Angle After 6 Wks. CCC | Contact Angle After 30,000 Cycles Wet Sled | Contact Angle After 60,000 Cycles Wet Sled |
|---|---|---|---|---|---|
| 5 | 110° | 88° | 54° | 99° | NA |
| 6 | 109° | 98° | 73° | 100° | 93° |

A comparison of Samples 5 and 6 shows that Sample 6, which included mixed aluminum oxide/acid prewashing, has superior water-repellent coating durability as compared to Sample 5, which included separate abrading and acid prewashing operations.

EXAMPLE 4

In this example selected parameters were varied to compare their effects on the durability of a water-repellent film on a glass substrate. Varied parameters included: (1) an acid solution precleaner versus an abrading compound/acid solution dispersion precleaner versus an abrading compound precleaner followed by washing with an acid solution; (2) varying acid concentration in the above-described precleaners; (3) varying the length of the holding period after applying the water-repellent coating from 8 hours to 96 hours under ambient indoor conditions before subjecting the sample to accelerated weathering testing; (4) heating the glass sample with a water-repellent film after a holding period to 150° F. (66° C.) for 2 or 10 minutes versus not heating after a holding period; and (5) washing the glass surface a second time with an acid solution prior to applying the water-repellent coating to increase the effective dwell time of the acid.

Ten groups of three pieces of Solex® glass (a total of 30 pieces, with each group of 3 pieces collectively considered a sample) were cleaned and coated with one application of a water-repellent coating using cotton pads, deionized water and paper towels, in a manner as discussed above in Example 3, according to the processing parameters set forth in Table 4. Dwell time for each acid application was about one minute. The $Al_2O_3$ used on all the samples was Microgit® WCA3T powder. In Samples 7–11, the abrading compound/acid solution was a dispersion of about 13 wt % $Al_2O_3$, about 0.87 wt % HCl, and the balance deionized water solution, while the abrading compound/acid solution in Sample 15 was a dispersion of about 13 wt % $Al_2O_3$, about 4.3 wt % HCl, and the balance deionized water solution. In Sample 13, the sample was rinsed with deionized water prior to the second acid application.

The samples were subjected to accelerated testing in the Q-C-T Cleveland Condensing Tester for six weeks (1,008 hours) with contact angle measurements recorded at the end of each week. The test results are reported in Table 5. As with Example 3, in measuring the contact angle, three readings were taken for each piece of each sample and the average of the three reading is reported below.

TABLE 4

| Sample No. | Abrading Compound | | Acid Solution | 2nd Acid Solution | Deionized Water (DI) Wipe | Holding Period | Heat Treatment |
|---|---|---|---|---|---|---|---|
| 7 | Al₂O₃ | Mixed With | 1 wt % HCl | — | DI Wipe | 8 hours | None |
| 8 | Al₂O₃ | Mixed With | 1 wt % HCl | — | DI Wipe | 24 hours | None |
| 9 | Al₂O₃ | Mixed With | 1 wt % HCl | — | DI Wipe | 96 hours | None |
| 10 | Al₂O₃ | Mixed With | 1 wt % HCl | — | DI Wipe | 8 hours | Heat to 150° F. for 10 mins. |
| 11 | Al₂O₃ | Mixed With | 1 wt % HCl | — | DI Wipe | 8 hours | Heat to 150° F. for 2 mins. |
| 12 | None | | 1 wt % HCl | — | DI Wipe | 8 hours | None |
| 13 | None | | 1 wt % HCl | 1 wt % HCl | DI Wipe | 8 hours | None |
| 14 | Al₂O₃ | DI Wipe | 1 wt % HCl | — | DI Wipe | 8 hours | None |
| 15 | Al₂O₃ | Mixed with | 5 wt % HCl | — | DI Wipe | 8 hours | None |
| 16 | None | | 5 wt % HCl | — | DI Wipe | 8 hours | None |

TABLE 5

| | | Contact Angle | | | | | |
|---|---|---|---|---|---|---|---|
| | Initial | 1 Wk. (168 hrs) | 2 Wks. (336 hrs) | 3 Wks. (504 hrs) | 4 Wks. (672 hrs) | 5 Wks. (840 hrs) | 6 Wks. (1008 hrs) |
| Sample 7 | 107° | 111° | 103° | 91° | 77° | 69° | 52° |
| Sample 8 | 108° | 111° | 102° | 88° | 83° | 69° | 53° |
| Sample 9 | 109° | 112° | 104° | 98° | 90° | 83° | 72° |
| Sample 10 | 108° | 108° | 103° | 92° | 80° | 69° | 48° |
| Sample 11 | 109° | 110° | 97° | 86° | 76° | 63° | 47° |
| Sample 12 | 110° | 106° | 94° | 74° | 73° | 50° | 41° |
| Sample 13 | 109° | 108° | 102° | 87° | 80° | 65° | 48° |
| Sample 14 | 109° | 107° | 94° | 83° | 73° | 55° | 39° |
| Sample 15 | 109° | 111° | 105° | 94° | 87° | 85° | 66° |
| Sample 16 | 108° | 109° | 92° | 67° | 47° | 39° | 30° |

The results reported in Table 5 show that:
(a) The water-repellent coating applied to Sample 7, which included an abrading compound/acid solution dispersion precleaning, outperformed the water-repellent coating applied to Sample 14, which included separate aluminum oxide abrading followed by a separate acid cleaning;
(b) The water-repellent coating applied to Samples 7 and 15, which included an abrading compound/acid solution dispersion precleaning, outperformed the water-repellent coating applied to Samples 12 and 16, respectively, which included an HCl-only precleaning;
(c) The water-repellent coating applied to Sample 15, which included a dispersion which was 4.3 wt % HCl outperformed the water-repellent coating applied to Sample 7, which included a dispersion which was 0.87 wt % HCl;
(d) The water-repellent coating applied to Sample 13, which included a two-minute acid dwell time precleaning, outperformed the water-repellent coating applied to Sample 12, which included a one minute acid dwell time precleaning;
(e) The water-repellent coating applied to Samples 8 and 9, which included a 24-hour to 96-hour hold period, respectively, outperformed the water-repellent coating applied to Sample 7, which included an 8-hour hold; and
(f) The water-repellent coating applied to Samples 10 and 11, which included a post bake at 150° F. (65.6° C.) for two minutes or ten minutes after the hold period, respectively, did not exhibit any improved performance as compared to the water-repellent coating applied to Sample 7, which did not include subsequent heat treatment. However, it is believed that higher temperatures and/or a longer heating period may improve coating durability.

EXAMPLE 5

While the dwell time of Example 4 provided improved durability, such dwell time adversely extends the length of time necessary to deposit the water-repellent composition over the glass surface. It would be beneficial if the dwell time could be reduced or eliminated. Thus in this experiment, a precleaner comparison test was conducted, substituting a 5 wt % HCl/deionized water acid solution for the 1 wt % HCl/deionized water acid solution, to determine if the more concentrated HCl acid solution would more quickly activate the glass surface, thus minimizing or eliminating the dwell requirement.

Four groups of four pieces of Solex® float glass (a total of 16 pieces, with each group of four pieces collectively considered a sample) were precleaned with an aluminum oxide/acid dispersion that included either a 1 wt % HCl acid solution or a 5 wt % HCl acid solution and either had no additional dwell time or an additional two minute dwell time in a manner as described in Example 4. The aluminum oxide grit size was Microgrit® WCA3T powder and comprised about 13 wt % of the abrading compound/acid solution dispersion. A water-repellent coating of the type disclosed in Example 3 was applied to the cleaned surface of each piece.

The samples were then held for 96 hours. Two pieces of each sample were subsequently tested in a Q-C-T Cleveland Condensing Tester and two pieces of each sample were subsequently tested in a QUV-B313 for a six-week period. The precleaning parameters for the four sets of samples are summarized in Table 6 below.

TABLE 6

| Sample No. | Abrading Compound/Acid Solution Dispersion | Dwell Time |
| --- | --- | --- |
| 17 | Al$_2$O$_3$/1 wt % HCl precleaner | no dwell |
| 18 | Al$_2$O$_3$/1 wt % HCl precleaner | 2 min. dwell |
| 19 | Al$_2$O$_3$/5 wt % HCl precleaner | no dwell |
| 20 | Al$_2$O$_3$/5 wt % HCl precleaner | 2 min. dwell |

Tables 7 and 8 show the contact angle of the water repelling film at the end of each week for the two testing procedures. As with Examples 3 and 4, in measuring the contact angle, three readings were taken for each piece of each sample. The average of the six readings (three reading on each of the two pieces subjected to the particular testing) is reported below.

TABLE 7

Contact Angle During CCC Testing

| | Weeks in the CCC | | | | | | |
| --- | --- | --- | --- | --- | --- | --- | --- |
| | 0 | 1 | 2 | 3 | 4 | 5 | 6 |
| Sample 17 | 105° | 80° | 69° | 63° | 62° | 57° | 50° |
| Sample 18 | 105° | 96° | 84° | 81° | 74° | 68° | 60° |
| Sample 19 | 105° | 93° | 80° | 78° | 75° | 74° | 65° |
| Sample 20 | 105° | 99° | 91° | 86° | 79° | 78° | 70° |

TABLE 8

Contact Angle During QUV Testing

| | Weeks in the QUV-B313 | | | | | | |
| --- | --- | --- | --- | --- | --- | --- | --- |
| | 0 | 1 | 2 | 3 | 4 | 5 | 6 |
| Sample 17 | 105° | 99° | 85° | 80° | 72° | 73° | 63° |
| Sample 18 | 105° | 103° | 97° | 94° | 86° | 79° | 72° |
| Sample 19 | 105° | 105° | 97° | 94° | 86° | 80° | 73° |
| Sample 20 | 105° | 105° | 100° | 101° | 90° | 87° | 79° |

From Tables 7 and 8, it may be seen that:

(a) increased dwell time increased the durability of the water-repellent film as measured by the contact angle method;

(b) the 5 wt % HCl abrading compound/acid solution dispersion produced better film durability than the 1 wt % HCl acid solution/abrading compound;

(c) the 5 wt % HCl abrading compound/acid solution dispersion without additional dwell time produced a film durability that is comparable to the film produced using the 1 wt % HCl abrading compound/acid solution dispersion with additional dwell time; and (d) the 5 wt % HCl abrading compound/acid solution dispersion with additional dwell time produced the most durable water-repellent film.

Therefore, while a dwell time improved durability, particularly when coupled with a higher acid concentration, acceptable durability may also be obtained with higher acid concentrations having little or no additional dwell time, as compared to lower acid concentrations which are coupled with a dwell time.

Based on the foregoing results, a preferred process to deposit the water-repellent composition on the surface of a substrate to obtain optimum durability, the substrate surface is prepared by cleaning the surface with an abrading compound/acid solution dispersion as disclosed herein, and permitting the dispersion to remain on the surface of the substrate for a predetermined dwell time before the dispersion is removed from the surface. The cleaning may be accomplished in any convenient manner, such as but not limited to wiping or rubbing the dispersion on the substrate surface either by hand or by using a mechanical applicator device. The surface is then coated with the water-repellent composition on the substrate surface. If desired, the coated substrate may be subjected to a holding period during which the coating is protected from abrasive forces and high-moisture conditions. More specifically, with respect to a glass substrate, the glass surface is mechanically and chemically cleaned with an abrading compound/acid solution dispersion, which is preferably 0.5 to 10 wt % acid, and more preferably 1 to 5 wt % acid, and preferably 5 to 30 wt % abrasive, and more preferably 15 to 20 wt % abrasive. The dispersion remains on the glass surface for about one minute, preferably at least about two minutes, and then removed in any convenient manner, e.g. by rinsing with deionized water and wiping with paper towels or a cloth, or flooding the surface with deionized water. The water-repellent composition is then applied to the prepared glass surface and the coated glass is stored for about 24 hours, preferably about 24 to 96 hours, in a manner such that the coated glass surface is maintained free from abrasive forces and high-moisture conditions, and in particular direct contact with water droplets.

Although not required, it is preferred that at least the coating operation, and preferably both the cleaning and coating operations be performed under controlled relative humidity and temperature conditions. More specifically, it is preferred that these operations be performed at a relative humidity of 30 to 80%, preferably 35 to 65%, and a temperature of 50° F. to 80° F., preferably 60° F to 80° F.

In the examples discussed above, the dispersion has been in a liquid form, i.e. an abrasive compound combined with an acid solution. It should be appreciated that the viscosity of the dispersion may be increased so that the dispersion is in the form of a thick slurry or paste by increasing the amount of abrasive material in the dispersion. In such an embodiment, the dispersion may include up to 75 wt % or more abrasive material. Viscosity may also be increased by adding thickeners to the dispersion, such as but not limited to, fumed silica or water soluble organic thickeners, e.g. polyvinyl alcohol.

As can be appreciated, the foregoing disclosure is not limiting to the invention and was presented to provide an appreciation of the invention. The scope of the present invention is defined by the following claims.

What is claimed is:

1. A method for improving the durability of a water-repellent film formed on a surface of a substrate comprising the steps of:

simultaneously abrasively and chemically preparing a surface of a substrate to expose an increased number of bonding sites over an unprepared surface of said substrate by applying a dispersion including an acid solution and an abrasive material to said surface;

removing said dispersion from said surface; and forming a water-repellent film over said surface, wherein said water-repellent film exhibits improved durability over a water-repellent film formed over an unprepared surface due, in part, to said increased number of bonding sites.

2. The method of claim 1 wherein said abrading material is selected from the group consisting of alumina, ceria, iron oxide, garnet, zirconia, silica, silicon carbide, chromic oxide, pumice and diamond.

3. The method of claim 2 wherein said concentration of said abrading material in said dispersion is in a range of about 5 to 30 weight percent.

4. The method of claim 3 wherein said concentration of said abrading material in said dispersion is in a range of about 15 to 20 weight percent.

5. The method of claim 1 wherein said acid solution is selected from the group consisting of solutions of hydrochloric acid, sulfuric acid, tartaric acid, phosphoric acid, hydrobromic acid, nitric acid, acetic acid, trifluoroacetic acid, oxalic acid and citric acid.

6. The method as in claim 5 wherein said concentration of said acid in said dispersion is in a range of about 0.5 to 30 weight percent.

7. The method as in claim 6 wherein said concentration of said acid in said dispersion is in a range of about 1 to 5 weight percent.

8. The method of claim 5 wherein said abrading material is selected from the group consisting of alumina, ceria, iron oxide, garnet, zirconia, silica, silicon carbide, chromic oxide, pumice and diamond.

9. The method of claim 8 wherein said concentration of said abrading material in said dispersion is in a range of about 5 to 30 weight percent and said concentration of said acid in said dispersion is in a range of about 0.5 to 30 weight percent.

10. The method as in claim 1 wherein after said water-repellent film-forming step further including the step of maintaining said substrate free from abrasive forces and high-moisture conditions for at least about 24 hours.

11. The method as in claim 10 wherein said maintaining step maintains said substrate free from abrasive forces and high-moisture conditions for about 24 to 96 hours.

12. The method as in claim 1 wherein said preparing step further includes the step of allowing said dispersion to remain on said surface for at least about one minute.

13. The method as in claim 12 wherein said preparing step allows said dispersion to remain on said surface for about two minutes.

14. The method of claim 1 wherein said forming step includes the step of forming a silane containing water-repellent film over said surface of said substrate.

15. The method of claim 14 wherein said water-repellent film includes a perfluoroalkylalkyl silane selected from compounds having a general formula $R_m R'_n SiX_{4-m-n}$, wherein R is a perfluoroalkyl radical, m is 1, 2 or 3, n is 0, 1, or 2, and m+n is less than 4, R' is selected from the group consisting of vinyl and alkyl radicals, and X is a radical selected from the group consisting of halogen, acyloxy, alkoxy radicals and mixtures thereof.

16. The method of claim 15 further including the step of applying a primer to said surface of said substrate after said preparing step and before said film-forming step.

17. The method of claim 15 wherein said water-repellent composition includes an integral primer.

18. The method of claim 15 wherein said water-repellent composition further includes a fluorinated olefin compound.

19. The method of claim 14 wherein said abrading material is selected from the group consisting of alumina, ceria, iron oxide, garnet, zirconia, silica, silicon carbide, chromic oxide, pumice and diamond and said acid solution is selected from the group consisting of solutions of hydrochloric acid, sulfuric acid, tartaric acid, phosphoric acid, hydrobromic acid, nitric acid, acetic acid, trifluoroacetic acid, oxalic acid and citric acid.

20. The method of claim 19 wherein said concentration of said abrading material in said dispersion is in a range of about 5 to 30 weight percent and said concentration of said acid in said dispersion is in a range of about 0.5 to 30 weight percent.

21. The method as in claim 20 wherein said preparing step further includes the step of allowing said dispersion to remain on said surface for at least about one minute, and after said forming step, further including the step of maintaining said substrate free from abrasive forces and high-moisture conditions for at least about 24 hours.

22. The method as in claim 21 further including the step of controlling temperature and humidity conditions such that said film-forming step is performed while maintaining a temperature in a range of about 50° F. to 85° F. and a relative humidity in a range of about 30 to 80 percent.

23. The method as in claim 22 further including the step of controlling temperature and humidity conditions such that said film-forming step is performed while maintaining a temperature in a range of about 60° F. to 80° F. and a relative humidity in a range of about 35 to 55 percent.

24. The method as in claim 22 further including the step of controlling temperature and humidity conditions such that said preparing step is performed under the same temperature and humidity conditions as said film-forming step.

25. The method of claim 1 wherein said substrate is selected from the group consisting of glass substrates, plastic substrates, enamel substrates, ceramic substrates, metal substrates and combinations thereof.

26. The method of claim 1 wherein said substrate is a first substrate and said water-repellent film is a first water-repellent film and improved durability of said first water-repellent film is determined by:

forming a second water-repellent film on a surface of a second substrate, wherein said second water-repellent film and said second substrate are similar to said first water-repellent film on said first substrate and said preparing step and removing step are not practiced on said surface of said second substrate;

subjecting each of said first water-repellent film on said first substrate and said second water-repellent film on said second substrate to accelerated weathering for a desired interval in a weathering chamber selected from the group consisting of a Q-C-T Cleveland Condensing Tester and a QUV-B313 Tester, wherein said Q-C-T Cleveland Condensing Tester is operated at a vapor temperature of 49° C. during said interval and said QUV-B313 Tester is operated with cycles of eight hours of ultraviolet light at a temperature of about 65 to 70° C. followed by four hours condensing humidity at 50° C. atmosphere temperature during said interval;

removing said substrates from said weathering chamber after said desired interval;

positioning said substrates such that said water-repellent films are in a horizontal orientation facing upward;

placing a first sessile drop of water on said first water-repellent film and measuring a first contact angle of said first sessile drop with said first water-repellent film; and placing a second sessile drop of water on said second water-repellent film and measuring a second contact angle of said second sessile drop with said second water-repellent film;

wherein said first contact angle is higher than said second contact angle, indicating said improved durability of said first water-repellent film.

27. The method of claim 1 wherein said substrate is a first substrate and said water-repellent film is a first water-repellent film and improved durability of said first water-repellent film is determined by:

forming a second water-repellent film on a surface of a second substrate, wherein said second water-repellent film and said second substrate are similar to said first water-repellent film on said first substrate and said preparing step and removing step are not practiced on said surface of said second substrate;

conducting Wet Sled Abrasion Test on a portion of said first water-repellent film on said first substrate and on a portion of said second water-repellent film on said second substrate by a, wherein said Wet Sled Abrasion Test is conducted for at least 5000 cycles;

removing said substrates from said Wet Sled Abrasion Tester;

positioning said substrates such that said water-repellent films are in a horizontal orientation facing upward;

placing a first sessile drop of water on said first water-repellent film over said abraded portion of said first water-repellent film and measuring a first contact angle of said first sessile drop with said first water-repellent film; and placing a second sessile drop of water on said second water-repellent film over said abraded portion of said second water-repellent film and measuring a second contact angle of said second sessile drop with said second water-repellent film;

wherein said first contact angle is higher than said second contact angle indicating said improved durability of said first water-repellent film.

28. A substrate coated with a water-repellent film of improved durability made by the method as recited in claim 1.

29. A method for improving the durability of a water-repellent film formed on a surface of a substrate comprising the steps of:

cleaning a surface of a substrate with a dispersion including an acid solution and an abrading compound;

removing said dispersion from said surface to provide a treated surface; and applying a perfluoroalkylalkyl silane containing water-repellent composition on said treated surface to form a water-repellent film.

* * * * *